No. 853,820. PATENTED MAY 14, 1907.
W. S. MOODY.
SYSTEM OF MOTOR CONTROL.
APPLICATION FILED OCT. 25, 1905.

Witnesses:

Inventor,
Walter S. Moody.
by Albert G. Davis
Att'y.

UNITED STATES PATENT OFFICE.

WALTER S. MOODY, OF SCHENECTADY, NEW YORK, ASSIGNOR TO GENERAL ELECTRIC COMPANY, A CORPORATION OF NEW YORK.

SYSTEM OF MOTOR CONTROL.

No. 853,820.　　　　Specification of Letters Patent.　　　　Patented May 14, 1907.

Application filed October 25, 1905. Serial No. 284,307.

*To all whom it may concern:*

Be it known that I, WALTER S. MOODY, a citizen of the United States, residing at Schenectady, county of Schenectady, State of New York, have invented certain new and useful Improvements in Systems of Motor Control, of which the following is a specification.

This invention relates to the control of regulating switches for transformers and similar devices driven by electric motors, and its object is to arrange the motor-control so that a careless operator will be prevented from leaving the switch-blade in a position bridging two adjacent contacts, thereby causing a local overloading of that portion of the transformer winding included between the contacts so bridged.

The invention consists in the combination with a dial-switch of a motor and a push-button or other self-opening switch for starting it, and a device for closing a shunt around said switch as soon as the motor begins running, so that the control of the motor is taken away from the operator, and the mechanism continues to run until said device opens the circuit. This operation is timed to occur only when the switch-blade has come to a position where it would be properly allowed to come to rest,—*i. e.*, squarely in contact with only one clip. This controlling device comprises, preferably, a rotatable drum of insulation geared to the motor and carrying two electrically-connected contact rings coöperating with contact fingers which form the terminals of the shunt around the self-opening starting switch or push-button. Each ring has a gap or break, and the fingers are so adjusted that they coincide with the gaps simultaneously, so that the device operates as a double-pole switch. The gearing is calculated to impart a single revolution to the drum during the time that the dial switch-blade is moving from one clip to the next, and the gaps in the rings are brought under the fingers just as this movement is completed. All the operator has to do, therefore, is to push the button and hold it until the motor starts; after which the rotating drum contacts will keep the motor running the proper length of time and stop it when the switch-blade completes its movement.

Figure 1:
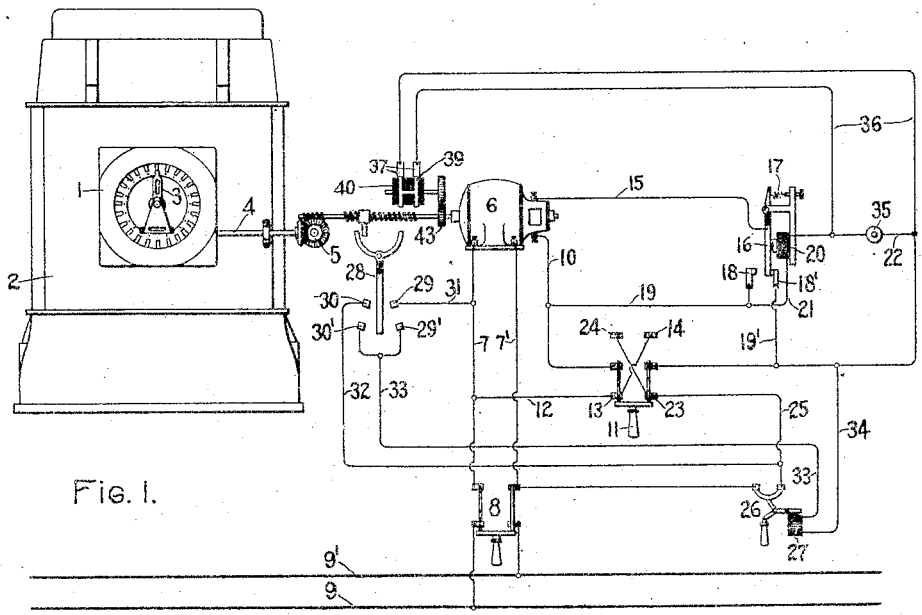
Figure 2:
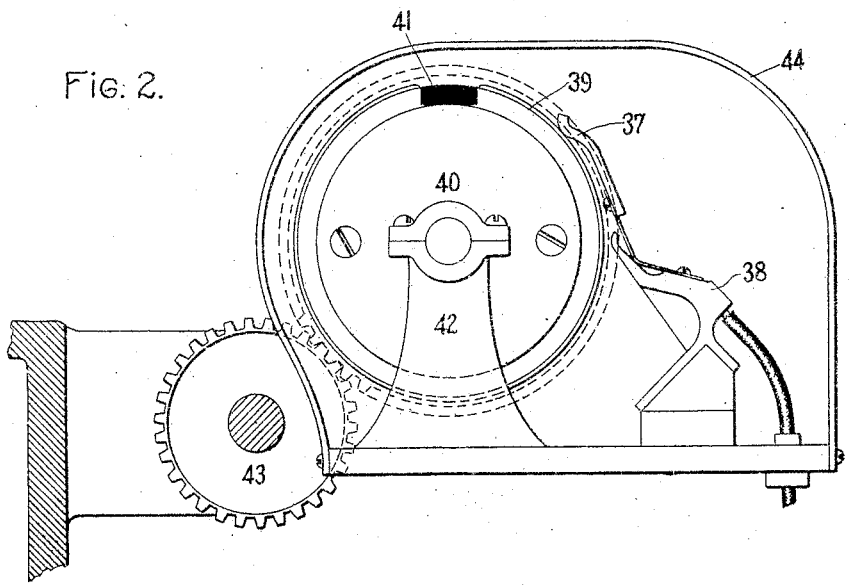

In the accompanying drawing, Figure 1 is a diagram of circuits and apparatus embodying my invention; and Fig. 2 is an end elevation of the drum switch. The diagram is purely illustrative; the parts not being drawn to a scale, and the gearing not being relatively timed.

The drawings shows the dial switch 1 of a transformer 2 as the apparatus whose movement is to be insured by my invention; though it is evident that there may be substituted for said switch any other mechanism in which a movable element is to be shifted a predetermined amount from one position to another with no possibility of stopping between. In the dial switch the movable shifting element is the switch-blade 3 which is actuated by a shaft 4 connected by gearing 5 with an electric motor 6. In this instance the motor is shunt-wound, its field magnet coils being connected by the leads 7 7' with the main switch 8; preferably of the double-pole type and connected to the mains 9 9'.

One of the armature brushes is connected with the lead 7 through the lead 10, one blade of a double-pole reversing switch 11, and a branch lead 12, connected with the cross-connected clips 13, 14 of the reversing switch. The other armature brush is connected by the lead 15 with the pivoted armature-lever 16 of an electromagnetic switch. A spring 17 holds said armature-lever normally against a contact 18 connected by a lead 19 with the lead 10, so that the motor armature is normally short-circuited. One terminal of the magnet coil 20 of the switch is connected by a lead 21 with the lead 19, and its other terminal is connected by a lead 22 with the other blade of the reversing switch. A branch lead 19' connects the lead 22 with the contact 18' on which the lever 16 closes when the electromagnet is energized. In the position shown, the blades of the reversing switch are closed upon the clips 13, 23, the latter being cross-connected with the clip 24, and also connects by a lead 25 with the lead 7'; a circuit-breaker 26 being interpolated in the lead 25.

The trip coil 27 of the circuit-breaker is controlled by a limit switch operated by the motor and acting to energize said trip coil when the switch-blade of the dial switch reaches the limit of its travel in either direction. The blade 28 of the limit switch closes on either the contacts 29 29' or 30 30', as the case may be. Contact 29 is connected by a short lead 31 with the lead 7. Contact 30 is connected by lead 32 with the lead 25, before the latter reaches the circuit-breaker. The two contacts 29' 30' are connected by a common lead 33 with the tripping coil 27, whose other terminal is connected by the lead 34 with the lead 22.

A self-opening switch, such as the push-button 35, is interpolated in the lead 22. The push-button is shunted by two leads 36 which terminate in spring-mounted fingers 37 mounted on a suitable base 38 and bearing against two metal rings 39 encircling a drum 40 of wood or other insulating material. The rings are electrically connected, and at one point are cut open, the gap being filled by a strip 41 of insulation. The drum is rotatably mounted in standards 42, and is geared by spur-gear and pinion 43 to the shaft of the motor 6. The working parts are inclosed in a cover 44, and the switch is suitably mounted on the transformer, together with the motor and the limit switch. The main switch, reversing switch, electromagnetic switch, push-button and circuit-breaker are mounted on a switch board of any convenient size and in any convenient location.

The operation of the device is as follows: Upon closing the main switch 8, the field coils of the motor are energized. The circuit-breaker 26 is then closed and after that the reversing switch. But inasmuch as the motor armature is short-circuited, no current will flow through it until the electromagnetic switch is energized by closing the push-button 35. Current then flows from the lead 7 by way of leads 12, 10, 19 and 21 to the electromagnet 20, thence by leads 22 and 25 to the lead 7', completing the circuit and energizing said magnet. The lever 16 is drawn over against the contact 18', opening the short-circuit and sending current through the motor armature from lead 10, thence by lead 15, lever 16, and leads 19', 22 and 25. As soon as the motor starts, it begins to move the switch-blade 3 of the dial switch from one clip to the next. At the same time the drum begins a rotation, and the insulating strip 41 is carried out from under the fingers 37, permitting them to make contact with the rings 39 and thus establish a shunt around the push-button which serves to keep the magnet energized and the motor armature circuit closed independent of the operator and the push-button. By the time the switch-blade 3 has arrived squarely on the next clip, the drum will have completed its rotation, and the insulating strip 41 will have been brought again under the fingers, thereby breaking the shunt, deënergizing the magnet, and letting the spring 17 withdraw the lever from the contact 18' and short-circuit the motor armature so that it stops promptly.

When the switch-blade reaches one end of its travel, the blade 28 of the limit switch closes upon the contacts 29 29' or 30 30' and thereby energizes the tripping coil 27 of the circuit-breaker and opens the lead 25. Then the motor cannot be started until the reversing switch has been thrown over, so that the switch-blade will begin its reverse movement.

What I claim as new, and desire to secure by Letters Patent of the United States, is,—

1. In combination with a main regulating switch comprising a series of stationary contacts and a movable arm arranged to engage said contacts successively, a driving motor geared to said arm, a reversing switch therefor, a self-opening starting switch for said motor, and a switch driven by said motor arranged to close a shunt circuit around said self-opening switch and to open the motor circuit automatically when the motor has made a predetermined number of revolutions corresponding to a movement of said arm from one contact of said series to the next.

2. In combination with a main regulating switch comprising a series of stationary contacts and a movable arm arranged to engage said contacts successively, a driving motor geared to said arm, a reversing switch therefor, a self-opening starting switch for closing the motor circuit momentarily at starting, and a rotary switch geared to said motor arranged to close a shunt circuit around said starting switch and to open the motor circuit automatically when the motor has made a predetermined number of revolutions corresponding to a movement of said arm from one contact of said series to the next.

3. In combination with a main regulating switch comprising a series of stationary contacts and a movable arm arranged to engage said contacts successively, a driving motor geared to said arm, a reversing switch therefor, a self-opening starting switch for said motor, a switch driven by said motor arranged to close a shunt circuit around said self-opening switch and to open the motor circuit automatically when the motor has made a predetermined number of revolutions corresponding to a movement of said arm from one contact of said series to the next, and a limit-switch controlled by the movement of the motor and adapted to open the motor circuit independently of the other motor-controlling switches when said arm reaches either extreme of said series.

4. The combination with a motor, of an electromagnetic switch controlling the armature circuit thereof, a push-button controlling said switch, a shunt around said button, and a switch controlling said shunt and actuated by said motor, a circuit-breaker for the armature circuit, and a limit-switch actuated by the motor and controlling said circuit-breaker.

In witness whereof, I have hereunto set my hand this 24th day of October, 1905.

WALTER S. MOODY.

Witnesses:
 EDWARD WILLIAMS, Jr.,
 MARGARET E. WOOLLEY.